No. 742,241. PATENTED OCT. 27, 1903.
G. M. SEARLE & G. N. SAEGMULLER.
TELESCOPE.
APPLICATION FILED MAY 20, 1903.
NO MODEL.
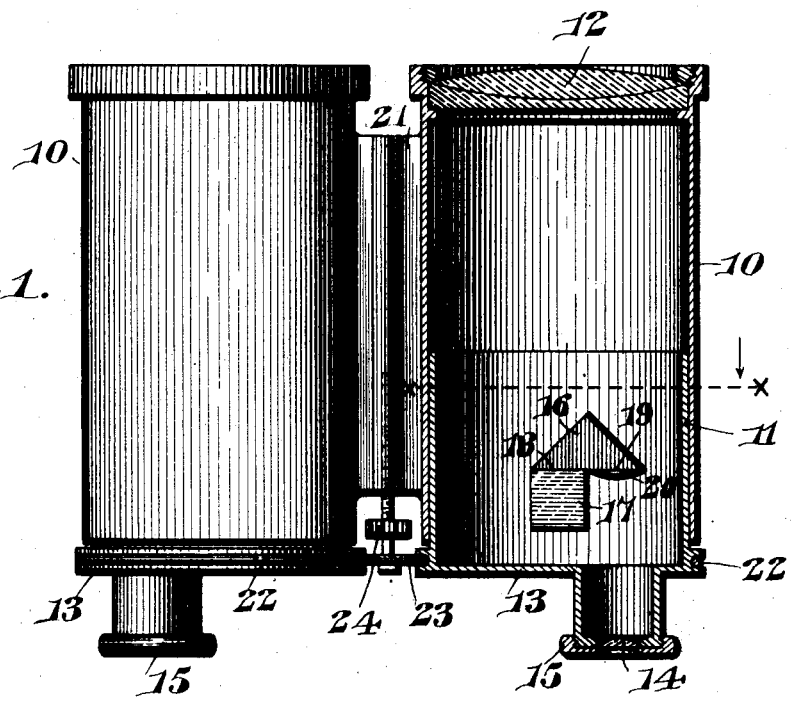
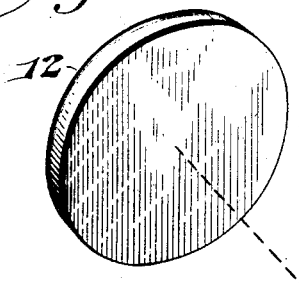
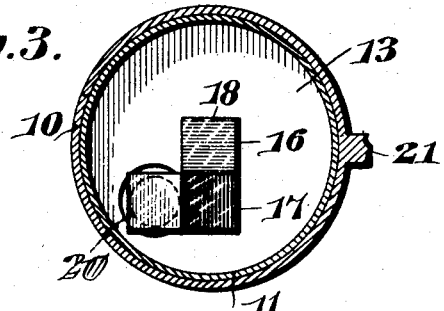
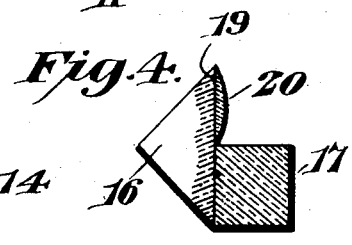
Witnesses
John J. Wilmarth
Marshall H. Knox
George M. Searle
George N. Saegmuller
Inventors
THE NORRIS PETERS CO., PHOTO-LITHO., WASHINGTON, D. C.

No. 742,241.

Patented October 27, 1903.

UNITED STATES PATENT OFFICE.

GEORGE M. SEARLE AND GEORGE N. SAEGMULLER, OF WASHINGTON, DISTRICT OF COLUMBIA.

TELESCOPE.

SPECIFICATION forming part of Letters Patent No. 742,241, dated October 27, 1903.

Application filed May 20, 1903. Serial No. 157,909. (No model.)

*To all whom it may concern:*

Be it known that we, GEORGE M. SEARLE and GEORGE N. SAEGMULLER, citizens of the United States, residing at Washington, District of Columbia, have invented certain new and useful Improvements in Telescopes, of which the following is a specification.

This invention relates to that class of telescopes employing prisms; and the improvements herein described and claimed are applicable to monocular, binocular, and analogous instruments of various sorts.

The primary object of the invention is to provide an eyepiece that will erect the image, is very compact, will permit the use of a large objective, and is readily adjustable, not only as to focus, but in the case of binoculars as to the distance between the eye-lenses, so that the instrument may be properly fitted to the eyes of the observer, this latter adjustment, moreover, not affecting in any manner the erection of the image nor the relation of the objective-lenses.

Another important object is to provide a structure wherein the number of different surfaces through which the light must pass is reduced to a minimum, thus obviating to a great extent one of the greatest objections to this class of instruments—namely, the loss of light.

The preferred embodiment of the invention is illustrated in the accompanying drawings and is described in the following specification. An inspection of the claims hereto appended will clearly indicate, however, that the invention is not limited to the exact structure set forth, but is open to many changes and modifications without departing from the spirit of the invention.

In the drawings, Figure 1 is a view, partly in elevation and partly in section, of a binocular constructed in accordance with the present invention. Fig. 2 is a sectional view through the same, taken on the line x x of Fig. 1. Fig. 3 is a disassociated perspective view showing the relation of the lenses and prisms, and Fig. 4 is a sectional view through the prisms.

The same reference-numerals are employed to designate similar parts throughout the various figures of the drawings.

In the embodiment hereinafter set forth a binocular is illustrated, though, as already stated, the invention may be employed in other connections. The two parts or members of the illustrated structure are duplicates, so that but one need be described.

As shown, a pair of telescoping tubes 10 and 11 are employed, the tube 11 being slidably and revolubly fitted within the tube 10. Suitably secured in the front end of the tube 10 by any suitable means is the object or objective lens 12, which, as illustrated, may be and is preferably of substantially the same diameter as the tube. The tube 11 constitutes a part of the eyepiece and has its rear end partially closed, as illustrated at 13, said end being provided with the usual eye-lens 14, which is preferably though not necessarily fitted in a short reduced extension 15. The eye-lens 14 is located eccentrically to the axis of rotation of the eyepiece-tube, for the purpose hereinafter set forth.

Interposed between the objective 12 and eye-lens 14 are angularly-disposed triangular prisms 16 and 17, certain of the faces of said prisms being at right angles in order to obtain total reflections. These prisms have their opposing faces abutted and secured together in any suitable fashion—as, for instance, by "Canada balsam," a perfectly transparent cement well known to the art. This cementing of the prisms together is a very important feature of the invention, as will be pointed out. The prisms are carried by the eyepiece-tube and may be attached thereto in any desired manner. The projecting flat face 18 of one of the abutted sides is located in opposing relation to the objective 12, and therefore constitutes the entrant face of the prism. The center of this face, the longitudinal axis of the tube, and the axis of the objective are coincident, and consequently the emergent face 19 of the other prism 17 is eccentric to said axes. The center of this face 19, however, is in line with the axis of the eye-lens 14. Interposed between the eye-lens 14 and the emergent face 19 is the usual field-lens 20, that is preferably cemented directly to the face 19, though this particular position is not necessary to the practical operation of the instrument.

In the illustrated form of the invention two members, as above described, are employed, the tubes 10 being secured together, so that they, and consequently the objectives carried by them, will remain in fixed relation. A web 21 is shown as the connection between said tubes. The tubes 11 are both slidable and rotatable in the tubes 10, and in order to provide for their simultaneous sliding movements and at the same time permit their free rotations means are shown in the form of rings 22, that surround the tubes 11, being seated in suitable annular grooves formed therein and being, furthermore, connected by an arm 23. Suitable adjustment may be obtained by a screw 24, threaded into the web 21 and having a journal-bearing in the arm 23. Instead of this structure any other found suitable or convenient may be employed.

The operation of the instrument is as follows: The rays of light passing through the objective will be concentrated and passing through the opposed entrant face 18 of the prism will be totally reflected by the angularly-disposed faces of the same to the prism 17, through said prism by corresponding reflection out of the emergent face 19, and consequently through the field-lens 20. From thence the rays will enter the eye-lens, and consequently the eye of the observer. Heretofore these prisms have been separated, one being placed near the objective. The result has necessarily been a small objective to prevent interference. Moreover, a very considerable loss of light has been occasioned by the passage of the light through the spaced opposing surfaces of the prisms. In the present structure, however, the prisms are placed in the rear portion of the instrument, so that a large objective may be employed, and, moreover, by the securing of the prisms together two surfaces at which light has heretofore been lost are obviated. This same advantage is also derived by the cementing of the field-lens to the emergent face of the prism 17. The arrangement of parts, moreover, erects the image without regard to the positions of the eye-lenses with respect to the objectives. To obtain the focus, the eye-tubes are adjusted either in or out, thus carrying the prisms and eye-lenses bodily toward or from the objectives. Furthermore, by revolving said eyepieces the eye-lenses being eccentrically disposed will be carried toward or from each other, and thus the instrument can be quickly and easily fitted to the eyes of the observer. From the above it will be apparent that the structure has distinct advantages, as above noted, and the objects pointed out in the preliminary portion of the specification are thereby obtained.

Having thus described our invention, what we claim as new, and desire to secure by Letters Patent, is—

1. In an instrument of the class described, an adjustable eyepiece, coacting angularly-disposed prisms carried by and movable with the eyepiece, and an eye-lens coacting with the prisms.

2. In an instrument of the class described, the combination with an objective, of an eye-lens located out of alinement with the objective, and angularly-disposed triangular prisms interposed between the lenses, said prisms having their opposing flat faces abutted, a portion of each of said faces projecting beyond the other prism, said projecting portions constituting respectively entrant and emergent faces that are in line with the objective and eye-lens.

3. In an instrument of the class described, an objective, an eyepiece comprising a tube adjustable toward and from the objective, an eye-lens carried by the tube, and angularly-disposed prisms coacting with the eye-lens and objective respectively, said prisms being mounted in and adjustable with the tube toward and from the objective.

4. In an instrument of the class described, an eyepiece comprising a tube, an eye-lens carried by the tube, and angularly-disposed prisms mounted in the tube and having abutting faces, one of said faces coacting with the eye-lens.

5. In an instrument of the class described, the combination with an object-lens, of an eye-lens, and a prism interposed between the lenses and having a revoluble adjustment with respect to the object-lens.

6. In an instrument of the class described, the combination with an object-lens, of an eye-lens, and a prism interposed between the lenses, said prism and eye-lens being adjustable toward and from the object-lens.

7. In an instrument of the class described, the combination with an object-lens, of an eye-lens, and a prism interposed between the lenses, said prism and eye-lens having a revoluble adjustment with respect to the object-lens.

8. In an instrument of the class described, the combination with telescoped tubes longitudinally slidable with respect to each other, of an object-lens mounted in one tube, an eye-lens mounted in the other tube, and angularly-disposed prisms carried by the tube having the eye-lens, said eye-lens and prisms being movable toward and from the object-lens.

9. In an instrument of the class described, the combination with a tube carrying an objective, of an eyepiece including a tube adjustably mounted with respect to the objective-tube and carrying angularly-disposed prisms having abutted faces.

10. In an instrument of the class described, the combination with a tube carrying an objective, of an eyepiece including a tube revolubly and longitudinally adjustable in respect to the objective-tube, and a prism carried by the eyepiece-tube and adjustable therewith.

11. In an instrument of the class described, the combination with an objective, and an eye-lens, of a prism interposed between the lenses and coacting therewith, and a field-lens carried by the prism.

12. In an instrument of the class described, the combination with an objective and an eye-lens, of angularly-disposed prisms interposed between the lenses and coacting respectively therewith and with each other, and a field-lens carried by the emergent face of the prism that coacts with the eye-lens.

13. In an instrument of the class described, the combination with a tube, of an objective mounted in the tube, an eye-tube longitudinally and revolubly adjustable in the objective-tube, angularly-disposed coacting prisms carried by the eye-tube, the entrant face of one of the prisms being in line with the axis of the objective, and an eye-lens having its axis disposed in line with the emergent face of the other prism.

14. In an instrument of the class described, the combination with fixed objective-tubes, of objective-lenses carried thereby, eyepiece-tubes revolubly adjustable with respect to the objective-tubes, eye-lenses eccentrically mounted in the eyepiece-tubes, and prisms coacting with the objective and eye lenses.

15. In an instrument of the class described, the combination with fixed objective-tubes, of objective-lenses carried thereby, eyepiece-tubes revolubly and longitudinally adjustable with respect to the objective-tubes, eye-lenses eccentrically mounted in the eyepiece-tubes, and prisms coacting with the objective and eye lenses, said prisms being carried by the eyepiece-tubes.

16. In an instrument of the class described, an objective, an eye-lens revolubly mounted eccentrically to the axis of the objective, and prisms coacting with the objective and eye-lens and remaining in said coacting positions during the revolution of said eye-lens.

17. In an instrument of the class described, the combination with an objective, of an eye-lens revolubly mounted eccentrically to the axis of the objective, and coacting prisms, one of said prisms being located in the axis of the objective and revolubly upon said axis, and another coacting with the eye-lens and disposed eccentrically to the axis of the objective.

18. In an instrument of the class described, the combination with an objective, of an eye-lens movable toward and from the objective and having a revoluble adjustment with respect thereto, and prisms interposed between the objective and eye-lens.

19. In an instrument of the class described, the combination with an objective, of an eye-lens movable toward and from the objective and having a revoluble adjustment with respect thereto, and prisms movable with the eye-lens, said prisms coacting with the eye-lens and the objective.

20. In an instrument of the class described, the combination with fixed tubes, of fixed objectives mounted therein, eyepiece-tubes slidably and revolubly mounted in the eyepiece-tubes, eye-lenses carried by the eyepiece-tubes and located eccentrically to the axis of the objectives, and angularly-disposed prisms carried by the eyepiece-tubes, certain of said prisms being located in line with the axes of the objectives, other of the prisms coacting with the eye-lenses.

21. In an instrument of the class described, the combination with objectives, of eyepieces movable toward and from the objectives and toward and from each other, and prisms fixed with relation to each other and coacting respectively with the objectives and eyepieces.

22. In a telescope, the combination with an objective, of an eyepiece, and angularly-disposed triangular prisms coacting with each other and coacting respectively with the objective and eye lenses, said prisms being located in rear of and in line with the objective, a portion of one prism being disposed in line with the cone of light-ray from the objective, the other prism being disposed out of line with said cone.

In testimony whereof we hereunto affix our signatures in presence of two witnesses.

GEORGE M. SEARLE.
  GEORGE N. SAEGMULLER.

Witnesses:
 JOHN J. WILMARTH,
 MARSHALL W. WINES.